United States Patent [19]
Schmitt et al.

[11] Patent Number: 5,235,950
[45] Date of Patent: Aug. 17, 1993

[54] SYSTEM FOR THE ELECTRONIC OPEN-LOOP AND/OR CLOSED-LOOP CONTROL OF THE POWER OF AN INTERNAL COMBUSTION ENGINE OF A MOTOR VEHICLE

[75] Inventors: Johannes Schmitt, Markgröningen; Martin Knoss, Asperg; Diethard Loehr, Schwieberdingen, all of Fed. Rep. of Germany

[73] Assignee: Robert Bosch GmbH, Stuttgart, Fed. Rep. of Germany

[21] Appl. No.: 741,532
[22] PCT Filed: Nov. 9, 1990
[86] PCT No.: PCT/DE90/00850
   § 371 Date: Aug. 9, 1991
   § 102(e) Date: Aug. 9, 1991
[87] PCT Pub. No.: WO91/08922
   PCT Pub. Date: Jun. 27, 1991

[30] Foreign Application Priority Data
Dec. 9, 1989 [DE] Fed. Rep. of Germany ....... 3940751

[51] Int. Cl.$^5$ .................... B60K 28/16; F02D 41/04
[52] U.S. Cl. .................................... 123/396; 180/197
[58] Field of Search ................ 123/396, 399, 350; 180/197

[56] References Cited
U.S. PATENT DOCUMENTS

| | | | |
|---|---|---|---|
| 4,640,243 | 2/1987 | Abo et al. | 123/399 |
| 4,727,838 | 3/1988 | Oshiage et al. | 123/399 |
| 4,729,356 | 3/1988 | Kaneko et al. | 123/399 |
| 4,796,717 | 1/1989 | Leiber et al. | 180/197 |
| 4,955,346 | 9/1990 | Kaneyasu et al. | 123/399 |
| 4,985,837 | 1/1991 | Togai et al. | 180/197 |

Primary Examiner—Andrew M. Dolinar
Attorney, Agent, or Firm—Walter Ottesen

[57] ABSTRACT

A system is suggested for the electronic open-loop control and/or closed-loop control of the power of an internal combustion engine of a motor vehicle in which the open-loop control or closed-loop control of the power is dependent on a parameter which represents the driver's wish, the open-loop control or closed-loop control being carried out in pregiven operating conditions independently of this parameter and occurring in these operating conditions, which are characterized by a reduction or an increase of the fuel supply due to an active drive slip control or engine drag torque control. For a faster response of the control system, the preset values which support the reduction or increase requirement, are dynamically amplified in their effect.

14 Claims, 3 Drawing Sheets

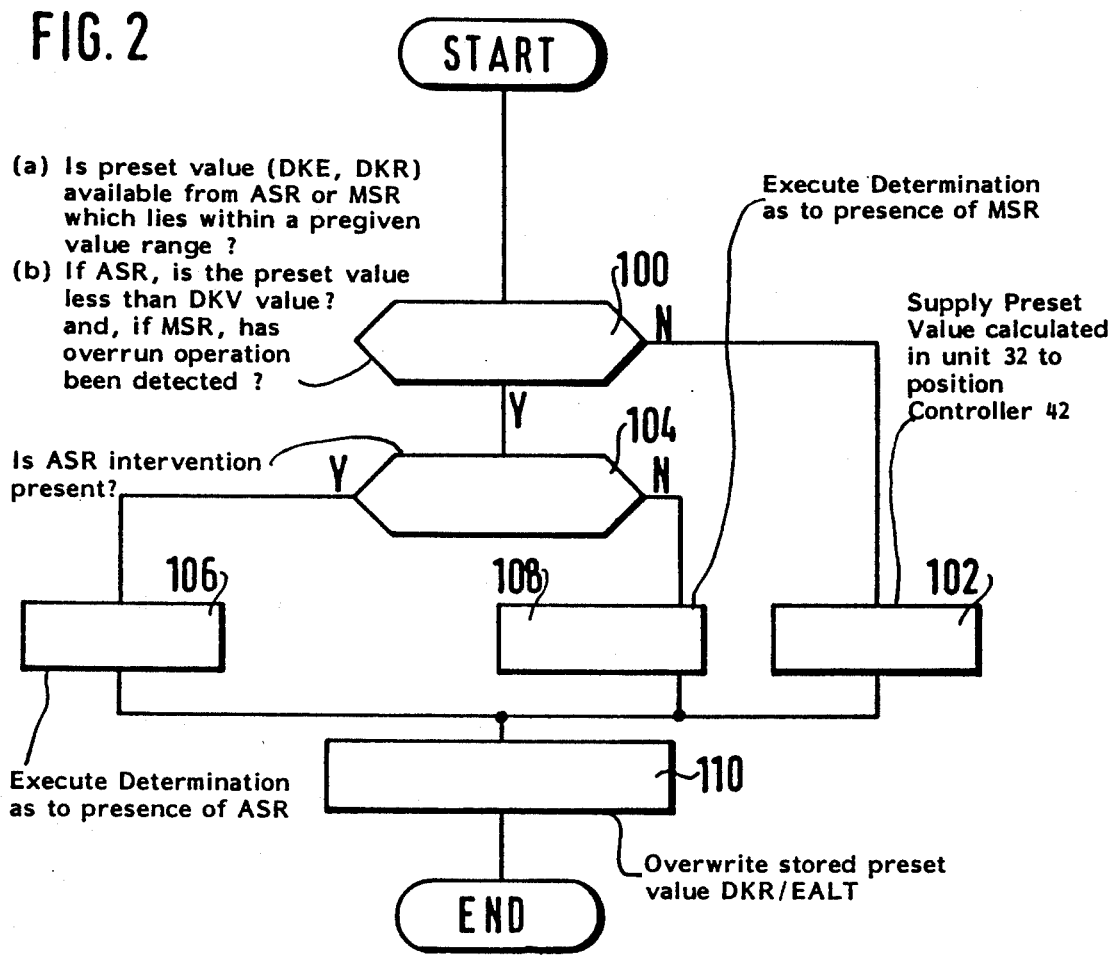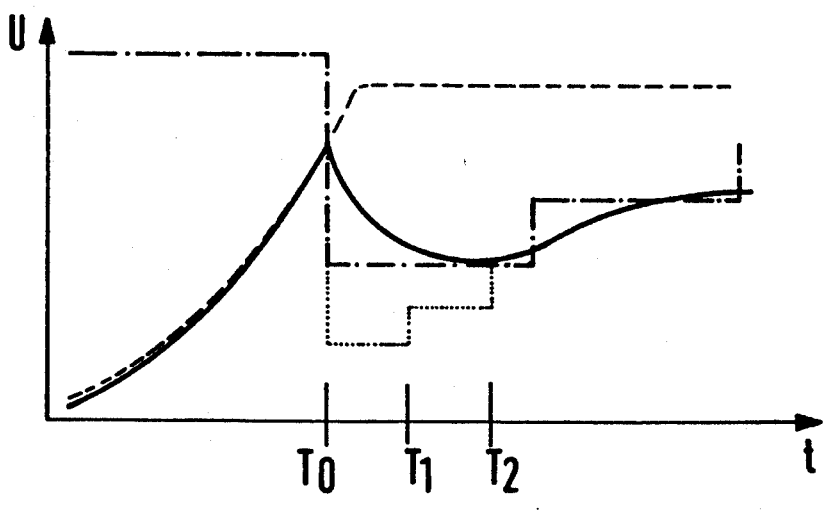

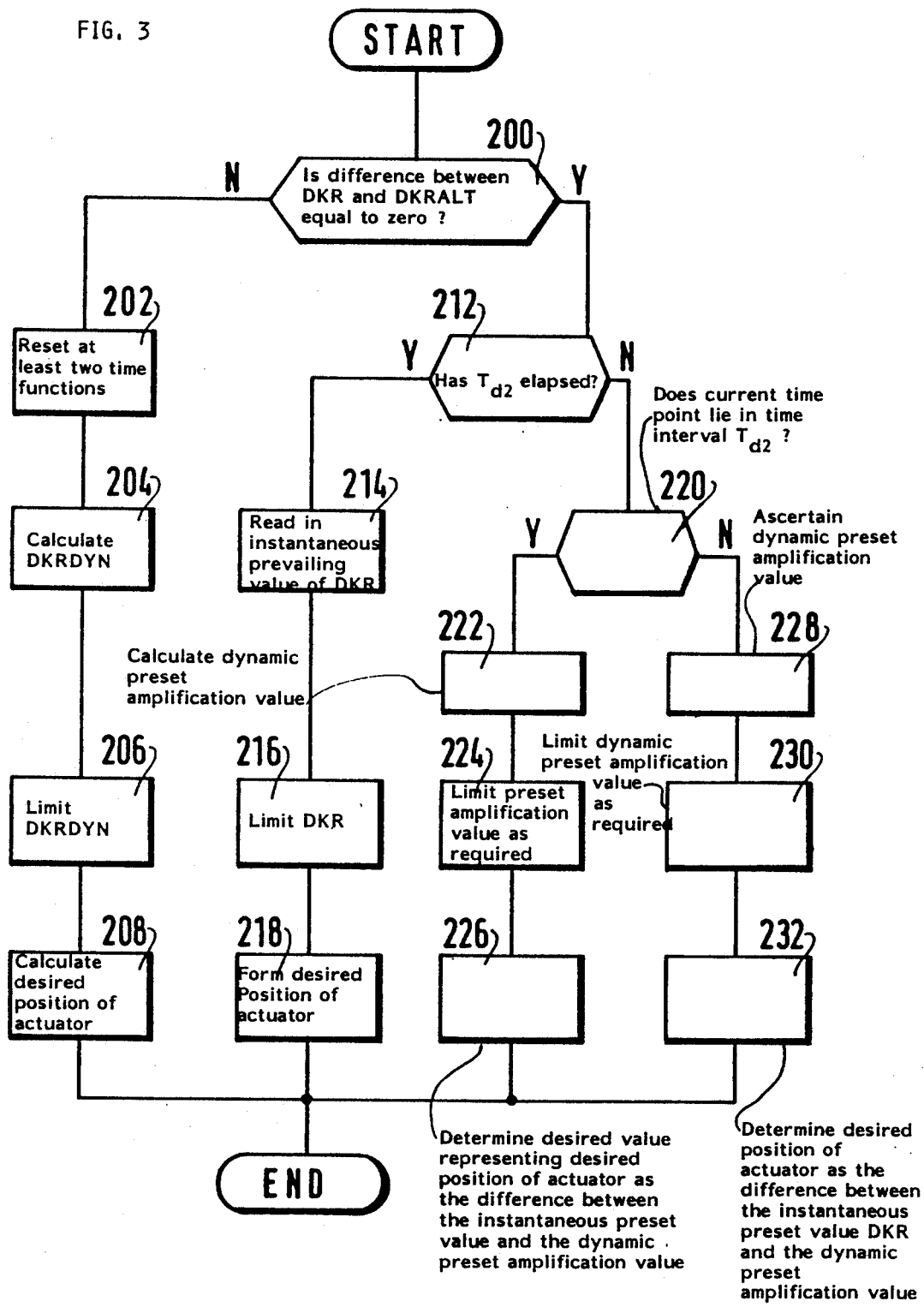

SYSTEM FOR THE ELECTRONIC OPEN-LOOP AND/OR CLOSED-LOOP CONTROL OF THE POWER OF AN INTERNAL COMBUSTION ENGINE OF A MOTOR VEHICLE

FIELD OF THE INVENTION

The invention relates to a system for the electronic open-loop and/or closed-loop control of the power of an internal combustion engine.

BACKGROUND OF THE INVENTION

Such a system is known from DE-OS 37 43 471. There, a system is suggested for the open-loop and/or closed-loop control of the power of the internal combustion engine, which reduces the power of the engine in certain operating conditions, characterized essentially by slip occurring on one of the driving wheels. In this system, the throttle flap, which is controlled outside the described operating condition and dependent on the driver's wish, is triggered independently of the driver to effect a reduction of power, that is, the throttle flap is turned back toward its closed position by a specified angle and is subsequently moved in steps, up to the point of the slip threshold of the driving wheels, to effect a power increase.

In U.S. Pat. No. 3,802,528, a system for influencing the engine torque is suggested, in which in the event of wheel slip during overrun operation, the fuel supply to the engine is increased in order to reduce the engine braking torque (engine drag torque control MSR). If control is via a throttle flap, this means that the throttle flap is opened. In overrun operation, this leads in principle to a reduction of the power of the internal combustion engine.

In the following, the discussion therefore will be only of a power reduction. In the case of ASR (automatic slip control), this leads to a reduction of the fuel supply (throttle flap is moved toward its closed position); in the case of MSR, it leads to an increase of fuel supply (throttle flap is opened).

When such systems are operated in conjunction with an electronic engine power control, disadvantages in the reaction speed of the closed-loop control system of the electronic engine power control will occur.

The invention is therefore based on the task of improving the reaction speed of an electronic open-loop and/or closed-loop control of the power of an internal combustion engine. This task is solved by an additional amplification of the values, in their effect, which represent the power reduction requirement.

EP-A 104 539 describes an arrangement for the reduction of the braking torque of internal combustion engines in overrun operation. Here, the fuel supply is increased in the overrun operation for a reduction of the braking torque of the engine, that is, the position of the throttle flap is changed to effect an increase in the air supply.

SUMMARY OF THE INVENTION

The procedure according to the invention has the advantage that, in the interplay of an electronic engine power control (EMS) with a drive slip or engine drag torque control (ASR or MSR), the reaction capability of the system to a requirement for power reduction is improved, without an intervention in the structure of the control system of the electronic engine power control being required. The structure of the circuit which controls the power of the engine can thus remain in the form in which it was selected with respect to the power control, idling control or after-running control, but the reaction time of the power change to a requirement for power reduction occurs with the dynamics necessary for a drive slip control or engine drag torque control. 17 description

BRIEF DESCRIPTION OF THE DRAWINGS

The invention is explained below with the aid of the embodiment illustrated in the drawing.

Finally, FIG. 4 shows the progression over time of the occurring signals.

DESCRIPTION OF THE PREFERRED EMBODIMENTS OF THE INVENTION

Figure 1:
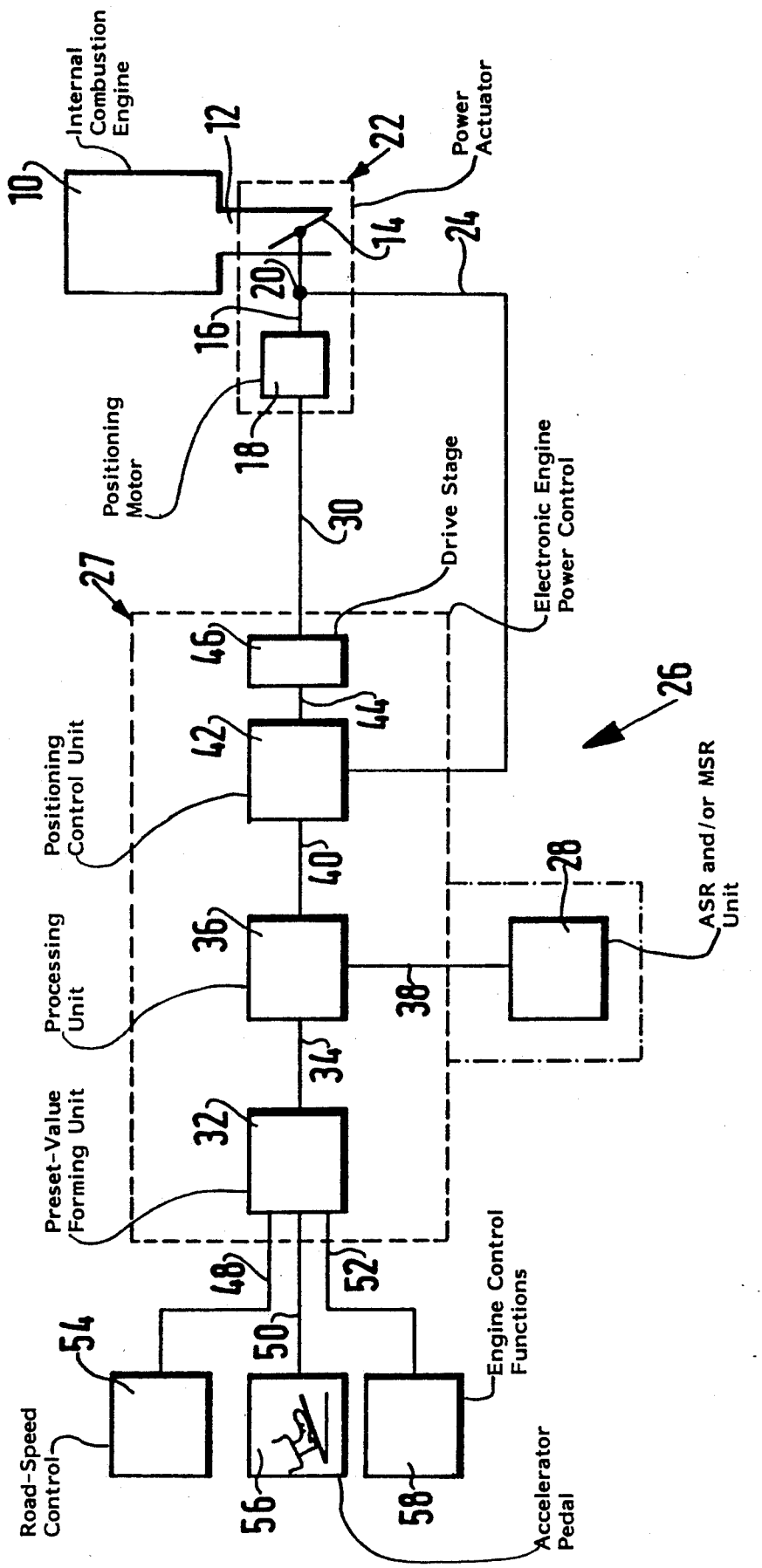
FIG. 1 shows, as an overview, a block circuit diagram of a system for the electronic closed-loop control and/or open-loop control of the power of an internal combustion engine, in which the procedure according to the invention and described by means of FIG. 2 and in more detail in FIG. 3 as a flow diagram comes into effect.

FIG. 1 shows an internal combustion engine 10 with a throttle flap 14, arranged in the intake system 12 of the internal combustion engine 10, for the control of the air supply to the engine or of the power of the engine. The throttle flap 14 is connected to an electrically actuated positioning motor 18 via a rigid connection 16. The throttle flap 14, the rigid connection 16 and the positioning motor 18 form together with a position transducer 20 the power actuator 22 of the engine. The position transducer 20, which for example is arranged in the embodiment shown in FIG. 1 on the rigid connection 16, sends a signal corresponding to the position of the power actuator 22 via its output line 24 to an engine control system 26.

The engine control system 26, which comprises the electronic engine power control 27 (shown in dashed lines) and an ASR and/or MSR unit 28 shown in dot-dash outline is connected to the power actuator 22 via a trigger line 30 which is connected to the positioning motor 18. The part of the engine control system 26 outlined in dash line comprises a unit 32 for the forming of a preset value for the actuator position, which is connected via a connection line 34 to a unit 36 for the processing of the ASR/MSR signal. With a second connection line 38, the unit 36 is further connected to the ASR/MSR unit 28. Output line 40 of unit 36 is connected to a first input of the positioning control 42, the second input of which has the connection line 24 applied to it. The output 44 of the positioning control connects the control to a drive stage 46, the output of which represents the connection line 30.

The unit 32 for the forming of the preset value is connected to further arrangements of the engine and/or the vehicle via its input lines 48, 50 and 52. The input line 48, for example, connects the unit 32 to a road-speed control 54, the input line 50 connects the unit 32 to an accelerator pedal 56 operated by the driver. Finally, the input line 52, symbolically shown as a single line, links the unit 32 to engine control functions 58, which have an influence on the power actuator position. Here, it is especially thought of a knock control, speed and/or revolution limitation or a catalyzer protection function.

In addition to the shown throttle flap control functions, the system described in FIG. 1 can be applied to a power actuator which controls the fuel supply to a Diesel engine.

In dependence upon its input signals, the unit 32 for forming the preset values generates a value for the position of the actuator, the value being the so-called throttle flap preset value (DKV) and corresponding to the input variables. The input values include a position signal indicative of the position of the accelerator pedal or a signal value representing the further engine control functions shown summarized in block 58. The forming of the preset value is calculated, for example, from a pregiven characteristic field. The DKV thus formed is sent to the unit 36 via the line 34.

By means of the unit 36, he determined DKV is combined with a value supplied via line 38 from the ASR and/or MSR unit 28 for reducing the engine power in accordance with the method shown further below. The generation of the preset value for the reduction (DKR) and increase (DKE) of the fuel supply, which takes place in the unit 28, is known, for example, from the initially mentioned state of technology, DE-OS 37 43 471 (ASR) and the U.S. Pat. No. 3,802,528 (MSR) and is therefore not further described.

The set value (DKS) formed from DKV and DKE/R for the position of the actuator is transmitted to the position controller 42 via the line 40 from the unit 36. The position controller 42 compares the calculated set-point value to the actual value (DKI) of the actuator position supplied via the line 24, and via the line 44 and the drive stage 46, the position controller 42 supplies a drive signal, which shows the difference between set-point value and actual value, to the actuator 22. The drive signal is transmitted via line 30 to the positioning motor 18, which, in accordance with the drive signal, changes the position of the actuator 22 so that the difference between desired value and actual value is reduced.

FIG. 2 shows, by means of a flowchart, the general run of the logic operation taking place within the unit 36 between position preset value (DKV) and ASR-preset value or MSR-preset value (DKR/E). At the start of the illustrated program part of the engine control system at the beginning of an operating cycle of the motor vehicle, a decision as to the execution of the ASR or MSR function is made in step 100. This requires at least the inquiry whether or not a preset value (DKE, DKR) from the ASR or MSR unit is available which lies within a pregiven value range, and, in the case of the ASR, whether the preset value is less than the DKV value of the unit 32, and in the case of the MSR, whether the overrun operation has been detected. If this is not the case, then in accordance with block 102, the preset value calculated by the unit 32 for the actuator position is supplied to the position controller 42 as the desired value (DKS), for setting the appropriate actuator position.

If in the inquiry block 100, the decision is made for the execution of the ASR or MSR function, then a determination is made in accordance with block 104 as to whether an ASR intervention is present and this is executed in accordance with block 106 by the process shown in FIG. 3. A corresponding procedure is represented by block 108 which is activated with an MSR intervention. To conclude the program part, a stored preset value DKR/EALT is overwritten in block 110 with the preset value DKR/E present in this program run, and the program run is ended.

The flowchart of FIG. 2 is based on a combined ASR/MSR system. The procedure in accordance with the invention, however, is not restricted to such a system, but can also be applied to systems which have only ASR or MSR functions. In such cases, the blocks 104 and 108 or 106 are dispensed with.

FIG. 3 shows, with reference to a flowchart, an embodiment of the procedure in accordance with the invention for the example of the ASR function. The implementation of an MSR function occurs in a corresponding manner with the requirement for a reduction being replaced by a requirement for an increase in the fuel supply.

The program part shown in FIG. 3 is started after the decision has been made for the implementation of the reduction or increase. The difference formed from the currently existing preset value (DKR) and the preset value (DKRALT) stored from the previous program run is then checked in block 200 for a pregiven preset value range. If this difference is other than 0, then at least two time functions which describe predetermined time intervals, are reset in block 202. Through this check for "other than 0", both a reduction and an increase of the requirement for power reduction will lead to the dynamic preset amplification described further below. Accordingly, the so-called dynamic preset amplification value DKRDYN is calculated in block 204 as a function of the following: the time interval, the preset value (DKRALT) stored from the previous program run, and the instantaneous value (DKR). The particular time interval is taken into consideration by a factor. Through DKRDYN, the preset values supplied by the ASR/MSR unit will be amplified in their effect. The factor which is allocated to the first time interval $T_{d1}$ which occurs earlier, is applied in block 204 at the start of the ASR intervention. This dynamic preset amplification value is hereafter, as required, limited in block 206 and the desired value, which is supplied to the position controller for the actuator position, is reduced to the instantaneous preset value DKR, reduced by the dynamic preset amplification value. By executing the control, the position of the actuator is adjusted to the desired position calculated in block 208.

If it is determined in inquiry step 200 that the difference from the stored and the instantaneous preset value equals zero, then the second time interval $T_{d2}$ which occurs later, is checked in step 212 to ascertain whether this has already elapsed. If this is so, then the instantaneous prevailing preset value DKR is read in (step 214) and limited (216) as required. The desired position of the actuator is formed in step 218 by the instantaneously prevailing preset value DKR.

If on the contrary the time interval $T_{d2}$ has not elapsed, then the earlier occurring first time interval $T_{d1}$ is interrogated in step 220 as to its time sequence. If it has elapsed, that is, if the current time point lies in the specified time interval $T_{d2}$, then the preset amplification value is calculated from the factor ascertained in block 204 as a function of the instantaneous preset value, of the stored preset value DKRALT, and of the factor (222) assigned to the time interval $T_{d2}$, and the present amplificator value is limited, as required, in step 224. In step 226, the desired value representing the desired position of the actuator is determined as the difference between the instantaneous preset value and the dynamic preset amplification value. The control then leads the position of the actuator to the desired value determined in step 226.

If the current time point is at the beginning or lies in the predetermined interval $T_{d1}$ (block 220), then the dynamic preset amplification value is ascertained in block 228 in accordance with block 204. Following the limitation, which may have been applied in appropriate circumstances, of the preset amplification value (230), the desired position of the actuator is determined in block 232 as the difference between the instantaneous preset value DKR and the dynamic preset amplification value determined in block 228. After blocks 208/218/226/232, the program part is ended and carried out in accordance with FIG. 2.

The determination of the dynamic preset amplification value as a function of the instantaneous (DKR) and the stored preset value DKRALT as preset prior to an occurring difference between DKRALT and DKR (200), and of the time ($T_{d1,2}$), can be determined in accordance with a pregiven formula or by reading from a table. The dynamic preset amplification value will depend preferably on the difference between DKRALT and the instantaneous preset value DKR, which is supplied by the ASR/MSR unit during the specific operating condition. This difference is weighted with a predetermined factor which takes the different time intervals into account. The factor is preferably selected so that it assumes a high value during the interval $T_{d1}$ which occurs earlier in time, and assumes a lower value during the interval $T_{d2}$ which occurs later in time. This produces a stepwise progression of the desired value which determines the desired position of the actuator. The two time intervals $T_{d1}$ and $T_{d2}$ are then a pregiven multiple of the program run time. The inventive concept is by no means limited to only two time intervals and it is certainly possible for several of these time intervals to be provided which will lead to a multi-step progression.

FIG. 4 illustrates the process according to the invention and its effects on the position of the actuator with respect to the time progression of the occurring signals as a function of time, and therewith on the engine output in the example of an ASR intervention. Analogous relationships are obtained for the MSR case, in which the dynamic preset value is added to the preset value of the MSR unit (DKE). The signal progression shown as a broken line in FIG. 4 signifies the preset value (DKV), which is determined in dependence upon the accelerator pedal, for the position of the actuator. The solid signal line represents the instant position of the actuator (DKI), while the dot-dash line represents the signal progression of the preset value (DKR) which reduces the engine output, this signal being emitted by the ASR unit. The dotted progression corresponds to the progression of the preset value reducing the power with the preset value being determined on the basis of the method of the invention while taking into account the dynamic preset amplification value (DKRDYN). The horizontal axis represents a time axis while the vertical axis indicates a parameter which represents the values addressed.

In a time range below the time TO, FIG. 4 shows an acceleration operation which is characterized by the continuous increase of the preset value (DKV) and therefore by the instantaneous position of the actuator. Since in the ASR case, the driving wheels show no spinning tendency at this instant, the preset value produced by the ASR unit is fixed to a static level DKRALT. At the instant TO, a spinning tendency of the driving wheels is established. In accordance with the function of the ASR unit, a preset value which reduces the engine power is established and passed to the engine power control. This function is shown in FIG. 4 by the jump-like progression of the dot-dash line at the instant TO. The preset value which represents the accelerator pedal position, for example, is continued unchanged. The dot-dash progression of the preset value given by the ASR unit is brought to its value, which it had assumed prior to the instant TO, in accordance with the state of technology to DE-OS 37 43 471 stated in the opening paragraph. The method in accordance with the invention is now shown in that at the instant TO, a dynamic preset amplification occurs, which is formed in accordance with the calculation rule explained by means of FIG. 3. The dynamic preset amplification then increases the effect of the preset value supplied by the ASR unit for the reduction of the actuator position or the engine power. According to the method of the invention, as shown by FIG. 3, the preset value corrected by the dynamic preset amplification is increased at specified intervals (for example, at instants T1 and T2), which represent the time elapsed since the occurrence of the slip tendency, by a specified value, from the instantaneous value and the preset value prior to instant TO, and a time factor, until the value specified by the ASR unit is reached. The progression of time, the desired value representing the desired position of the actuator, is shown by the dashed line, at the instant TO by the dot-dash line and the dotted line, between the instants TO and T2 by the dotted line, after the instant T2 by the dot-dash line.

The progression of the actual position of the actuator is described with reference to the solid line. The response time to a request for reduction (in the MSR case to a request for an increase) of the fuel supply is then considerably improved.

To summarize, it may be noted that the described procedure acts as a fast acting precontrol for the actuator position, with the values corresponding to the additional amplification of the precontrol values.

We claim:
1. A system for electronically open-loop and/or closed-loop controlling the power of an internal combustion engine of a motor vehicle which can enter an operating state wherein slip of one or more wheels can occur, the system comprising:
an electrically actuable member which can be adjusted in position for influencing the power supplied by the engine;
means for supplying a variable indicative of the driver's request;
a control unit for receiving said variable and for supplying a signal to said actuable member in response to said variable thereby positioning said actuable member to influence said power supplied by the engine;
said control unit including slip detecting means for detecting slip in at least one of the wheels of the motor vehicle and circuit means for acting on said actuable member in response to said slip so as to reduce or increase the position of said actuable member independently of said variable;
said circuit means including preset-value means for supplying a preset value for effecting the reduction or increase in said position of said actuable member when said slip is detected thereby causing said control unit to adjust said actuable member in de- pendence upon said preset value during said operating state;

said preset-value means including means for additionally amplifying said preset value to effect a more rapid positioning of said actuable member in dependence upon said preset value whereby a shorter response time of said actuable member is achieved and means for terminating the amplification of said preset value during said operating state.

2. The system of claim 1, wherein a precontrol of the position of the actuable member in the sense of a fast change of position occurs by means of the additional amplification, with the values of the additional amplification corresponding to precontrol values of the position of the actuable member.

3. The system of claim 1, wherein the amplified values determine the position of the actuable member.

4. The system of claim 1, wherein the amplified values are superposed on the desired value of a control for influencing the fuel supply to the engine, in particular a positioning control of the actuable member which influences the fuel supply.

5. The system claim 1, wherein the additional amplification is reduced in pregiven steps.

6. The system claim 1, wherein the additional amplification is reduced with a pregiven step level at pregiven time points.

7. The system of claim 1, wherein said preset value has a value prior to the occurrence of the operating state; and, wherein the amount of the additional amplification is dependent on the initial value of the preset value prior to the occurrence of the operating state, the preset value which exists at the occurrence of the operating state and at the time elapsed since the occurrence of the operating state.

8. The system of claim 1, wherein said preset value has a value prior to the occurrence of the operating state; and, wherein the occurrence of the definite operating state is detected from a comparison of a stored value, which represents the preset value prior to the occurrence of the operating state, to the instantaneous preset value.

9. A method for a system for the electronic open-loop control and/or closed-loop control of the power of an internal combustion engine of a motor vehicle by means of an electronic control unit, which influences the engine power at least is relation to a variable which indicates the driver's wish via the position comprising an electrically operable actuator in which the control unit, in an operating state characterized by slip of at least one wheel of the motor vehicle, controls the position of the electrically operable actuator in dependence on a variable which is independent of the driver's wish, the operating state being determined by a demand for a reduction or an increase of the position of the actuator, that with the occurrence of this operating state, the control unit is supplied with values which effect such a reduction or increase, and that the control unit changes the position of the actuator in this operating state in dependence on these values with an additional amplification of these values occurring in the direction of their effect in order to achieve a shorter response time of the actuator, upon occurrence of said operating state, the reduction or increase in said position of said actuator being effected by preset value means supplying an instantaneous preset value, the method comprises the steps of:

determining the additional amplification as a function of a stored value representing said preset value prior to the occurrence of said operating state, said instantaneous preset value, and a time factor;

determining the desired value of the position control from this additional amplification and said instantaneous preset value;

determining anew the additional amplification after the lapse of a pregiven time interval, as a function of the stored value, the instantaneous value, and of a time factor which is less than the time factor of the first determination;

predetermining the desired value from the newly determined precontrol value;

repeating these steps for a pregiven number of intervals; and, fixing the instantaneous preset value as desired value after the lapse of the last interval.

10. The method of claim 9, wherein said operating state is detected by an ASR unit and, an MSR unit.

11. The method of claim 9, wherein said operating state is detected by an ASR unit.

12. The method of claim 9, wherein said operating state is detected by an MSR unit.

13. A system for electronically open-loop and/or closed-loop controlling the power of an internal combustion engine of a motor vehicle which can enter an operating state wherein slip of one or more wheels occurs, the system comprising:

an electrically actuable member which can be adjusted in position or adjusting the power supplied by the engine;

sensor means for supplying a sensor signal indicative of the driver's request;

a control unit for receiving said sensor signal and for supplying a signal to said actuable member in response to said sensor signal thereby positioning said actuable member to adjust said power supplied by the engine;

ASR/MSR means for supplying an intervention signal to said control unit to adjust the position of said actuable member independently of said sensing signal in response to slip at a wheel of the motor vehicle;

said control means including processing means for processing said sensor signal and said intervention signal to produce an output signal for acting on said actuable member; and, amplification means for amplifying said intervention signal at the start of said operating state for increasing the speed of response of said actuable member and for allowing the amplification of said intervention signal to decay during said operating state.

14. The system of claim 13, means for interrupting the amplification of said intervention signal during said operating state thereby preventing said actuable member from being overdriven and avoiding an unwanted stalling of the engine or acceleration of the motor vehicle.

* * * * *

UNITED STATES PATENT AND TRADEMARK OFFICE
CERTIFICATE OF CORRECTION

PATENT NO. : 5,235,950

DATED : August 17, 1993

INVENTOR(S) : Johannes Schmitt, Martin Knoss and Diethard Loehr

It is certified that error appears in the above-identified patent and that said Letters Patent is hereby corrected as shown below:

In column 2, lines 6 and 7:  delete "17 description".

In column 3, line 16:  delete "he" and substitute -- the -- therefor.

In column 4, line 61:  delete "present" and substitute -- preset -- therefor.

In column 4, line 62:  delete "amplificator" and substitute -- amplification -- therefor.

In column 7, line 47:  delete "is" and substitute -- in -- therefor.

In column 7, line 48:  delete "comprising" and substitute -- of -- therefor.

In column 8, line 3:  delete "comprises" and substitute -- comprising -- therefor.

In column 8, line 34:  delete "or" and substitute -- for -- therefor.

Signed and Sealed this

Fifth Day of April, 1994

*Attest:*

BRUCE LEHMAN

*Attesting Officer*  *Commissioner of Patents and Trademarks*